United States Patent
Nagatomo et al.

(10) Patent No.: US 6,185,610 B1
(45) Date of Patent: *Feb. 6, 2001

(54) NETWORK SYSTEM SPONTANEOUSLY TRANSMITTING DATA FROM SERVER MACHINE TO USER TERMINAL HAVING FIRST AND SECOND PARTS FOR REQUESTS AND MESSAGE, RESPECTIVELY

(75) Inventors: Yasuhito Nagatomo; Shinji Kubota; Tadashi Kinebuchi; Hiroyuki Baba; Masanori Konishi, all of Suwa (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/051,045
(22) PCT Filed: Aug. 1, 1997
(86) PCT No.: PCT/JP97/02687
§ 371 Date: May 4, 1998
§ 102(e) Date: May 4, 1998
(87) PCT Pub. No.: WO98/06035
PCT Pub. Date: Feb. 12, 1998

(30) Foreign Application Priority Data

Aug. 2, 1996 (JP) .................................................. 8-220615

(51) Int. Cl.[7] ........................................................ G06F 13/00
(52) U.S. Cl. .......................... 709/219; 709/231; 709/329
(58) Field of Search ................................. 709/201, 202, 709/203, 205, 206, 217, 219, 223, 225, 231, 232, 329, 328; 707/104, 501; 705/26, 27

(56) References Cited

U.S. PATENT DOCUMENTS

| | | | |
|---|---|---|---|
| 5,761,662 | * | 6/1998 | Dasan ........................................ 707/10 |
| 5,838,682 | * | 11/1998 | Dekelbaum et al. ................... 370/401 |
| 5,905,865 | * | 5/1999 | Palmer et al. ........................... 455/3.1 |
| 5,913,040 | * | 6/1999 | Rakavy et al. .......................... 370/229 |
| 6,044,205 | * | 3/2000 | Reed et al. . |

FOREIGN PATENT DOCUMENTS 9-81473   3/1997   (JP) .

* cited by examiner

Primary Examiner—Viet D. Vu
(74) Attorney, Agent, or Firm—Oliff & Berridge (57) ABSTRACT

In a system constituted by using the Internet techniques, there is provided a network system which can spontaneously transmit data from a server machine to a desired user terminal.

The network system is a server-client type network system including a server machine 10 for storing the data of a plurality of pages which are described in a language along the specification of the HTML to be hyperlinked, and a plurality of user terminals 30 for displaying a page of the server machine on a display by using a Web browser.

The server machine 10 includes a data transmission unit 80 for spontaneously transmitting the data described in the language along the specification of the HTML to an arbitrary user terminal.

Each of the user terminals 30 monitors reception of the spontaneously transmitted data by using the Web browser and displays the received spontaneously transmitted data on the display.

19 Claims, 8 Drawing Sheets

NETWORK SYSTEM SPONTANEOUSLY TRANSMITTING DATA FROM SERVER MACHINE TO USER TERMINAL HAVING FIRST AND SECOND PARTS FOR REQUESTS AND MESSAGE, RESPECTIVELY

BACKGROUND OF THE INVENTION

1. Field of the Invention

The present invention relates to a network system in which a page of a server, in particular, a page described in a language being structured and along the specification of the HTML, can be searched and seen from a user terminal by using a Web browser.

2. Background of Related Art

A conventional server, client type network system in which a server machine is connected to a plurality of user terminals through lines is popularly used.

Various techniques used on the Internet can also be used as group ware in view of transmission of information and sharing of information.

For this reason, in accordance with popularization of the Internet, an internal network using the Internet techniques, i.e., a server-client type intranet has been developed to be practically used.

However, in a general network or the above intranet, as far as the network or the intranet is of a server-client type, data can be supplied as only the form of response depending on a request from a user terminal serving as a client, and data cannot be spontaneously supplied.

For example, in an intranet at present, a switching operation for pages (documents) provided from a server is a user terminal with initiative. More specifically, although a user terminal can browse various pages prepared for the server with the initiative, a display on the terminal cannot be controlled by the server with initiative.

For this reason, the following problem is posed. That is, when the intranet is utilized as not only an information presenting means in an office or an organization, but also a server-client type network for presenting a specific service to a user, e.g., an order system for a restaurant, the intranet cannot be used such that server spontaneously transmits a completion message to the user terminal to display it on the display when a dish ordered from the user terminal is completed.

As one means for solving the problem, a means for causing a server to transmit E-mail to a user terminal to display the contents of the E-mail is considered.

However, in this manner, in addition to a document having a hyperlink structure described in a language along the specification of the HTML or a Web browser for searching this document, an E-mail transmission/reception dedicated program and a system subordinate to the program must be set in a server and a user terminal. As a result, the following problem is posed. That is, the entire system has high cost and a complex structure, and the merits of a server-client type network system constituted by using the Internet techniques are considerably degraded.

The present invention has been made in consideration of the above problems, and has as its object to provide a network system, which is constituted by using the Internet techniques, in which data can be spontaneously transmitted from a server machine to a desired user terminal.

SUMMARY OF THE INVENTION

In order to achieve the above object, the invention may be characterized in that, in a network system having
a server machine for storing data of a plurality of pages which are described in a language along the specification of the HTML to be hyperlinked, and
a plurality of user terminals for displaying a page of the server machine on a display by using a Web browser.
The server machine comprises
a device for spontaneously transmitting the data described in the language along the specification of the HTML to an arbitrary user terminal, and
each of the user terminals comprises
a device for monitoring reception of the spontaneously transmitted data and displaying the received spontaneously transmitted data on the display.

Here, the server machine and the user terminal are preferably formed as in the inventions described below.

The invention
may include a server machine connected to a network system, and
is characterized by comprising
a storage device for storing data of a plurality of pages which are described in a language along the specification of the HTML to be hyperlinked, and
a device for spontaneously transmitting the data described in the language along the specification of the HTML to an arbitrary user terminal.

The invention
may include a user terminal connected to a network system having a server machine for storing data of a plurality of pages which are described in a language along the specification of the HTML to be hyperlinked, and is characterized by comprising
a display,
a device for displaying a page of the server machine on the display by using a Web browser, and
a device for monitoring reception of spontaneously transmitted data which is spontaneously transmitted from the server machine and described in the language along the specification of the HTML to display the received spontaneously transmitted data on the display.

In each user terminal, a Web browser used to access the server machine is set. A user uses the user terminal to access a page of the server machine described in the language along the specification of the HTML, and the corresponding page is displayed on the display of the terminal of the user. Therefore, the user can see the page stored in the server.

In such a server-client type network system, data is presented from a server machine to a user terminal after a request from the user terminal is received by the server machine. However, it is often necessary that data is spontaneously transmitted from the server machine to the user terminal to display the data on the display of the user terminal.

The present invention makes it possible to perform the spontaneous data transmission from the server machine to the user terminal by using the Internet techniques without degrading the advantages of the Internet techniques.

For this reason, a device for spontaneously transmitting desired data to the server machine is arranged. At this time, the spontaneously transmitted data is described in the language along the specification of the HTML such that the contents of the data can be interpreted by using the Web browser to be displayed on the display of a user terminal.

Therefore, each user terminal can monitor reception of the spontaneously transmitted data using the Web browser and display the received spontaneously transmitted data on the display.

As described above, according to the present invention, unlike a general network, data transmission from a server machine to a user terminal is not performed using an E-mail transmission technique, and data transmission can be performed by directly using Internet techniques. For this reason, the cost of the entire system can be reduced, and spontaneous message transmission from the server machine to the user terminal can be smoothly and reliably performed.

The invention may include that the server machine and the user terminals comprise a first port for transmitting/receiving data transmitted from the server machine in response to a request from the user terminal, and a second port for transmitting/receiving data spontaneously transmitted from the server machine.

Each of the user terminals may monitor reception of the spontaneously transmitted data from the second port and display the received spontaneously transmitted data on the display.

The invention may also include that the server machine comprises a first port for transmitting/receiving data in response to a request from the user terminal, and a second port for transmitting/receiving spontaneously transmitted data.

The invention may also include that the user terminal comprises a first port for transmitting/receiving data transmitted from the server machine in response to a request from the user terminal, and a second port for transmitting/receiving data spontaneously transmitted from the server machine.

The user terminal may monitor reception of the spontaneously transmitted data from the second port and display the received spontaneously transmitted data on the display.

As described above, the system according to the present invention is constituted such that transmission/reception of data transmitted/received as data of a general server-client model is performed through the first port, and transmission/reception of data spontaneously transmitted from the server machine to the user terminal is performed through the second port. In this manner, when each user terminal monitors the second port, reception of a spontaneous message from the server machine can be easily and reliably detected.

As one aspect of the invention, each of the user terminals is formed such that, when spontaneously transmitted data from the second port is received, the received spontaneously transmitted data is interrupt-displayed on the display.

The user terminal may display a display screen of the display such that the display screen is divided into a display area for displaying the page and a display area for displaying the spontaneously transmitted data.

The display screen of the display of the user terminal may be displayed such that the display screen is divided into a display area for displaying a page read by the Web browser and a display area for displaying the spontaneous data from the server machine. Therefore, the spontaneously transmitted data from the server machine can be reliably transmitted to a user.

The server machine may store a service to be presented to the user terminal as the data of a plurality of pages which are described in a language along the specification of the HTML to be hyperlinked.

With the above arrangement, a network system for presenting various services from a server machine to a user terminal may be constructed by using Internet techniques.

DETAILED DESCRIPTION OF PREFERRED EMBODIMENTS

A preferred embodiment of the present invention will be described below with reference to the drawings.

Figure 1A:
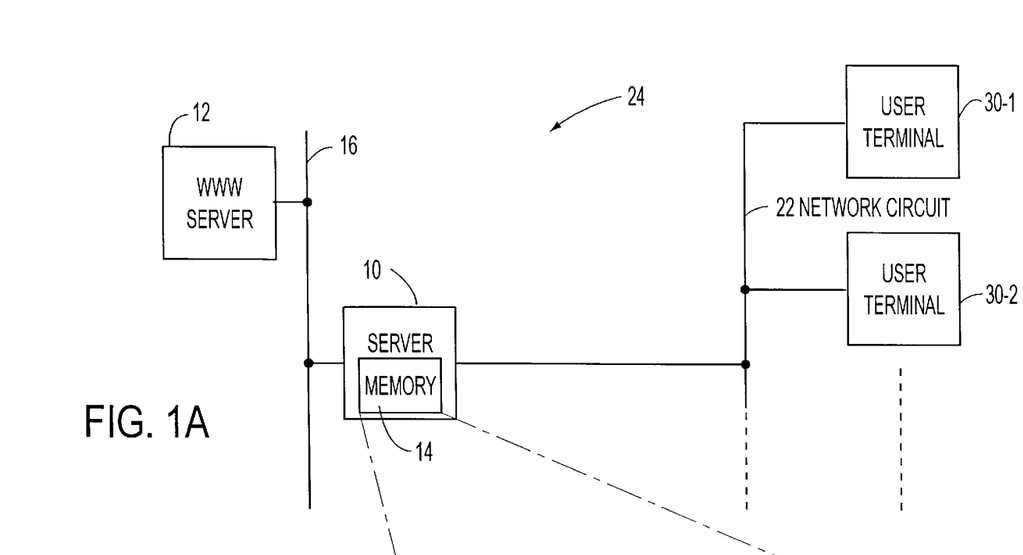
FIGS. 1A and 1B are schematic views of a network system according to the present invention.

FIG. 1A shows a preferred example of a network system to which the present invention is applied.

In the network system according to this embodiment, a server 10 for presenting a predetermined service is connected to a plurality of user terminals 30-1, 30-2, . . . through a network line 22 to form an intranet 24.

In this embodiment, the intranet 24 is installed in, e.g., an amusement park, and the user terminals 30-1, 30-2, . . . are arranged at tables in a restaurant placed in the amusement park.

The server 10 is connected to another WWW server 12 on the Internet through an Internet line 16, and the user terminal 30-1 is arranged such that the user terminal 30-1 can also access another WWW server 12 of an Internet line 16 through the server 10.

The server 10 is formed by using a high-performance computer as is well known. A memory 14 in which various data are stored is arranged in the server 10.

Figure 1B:
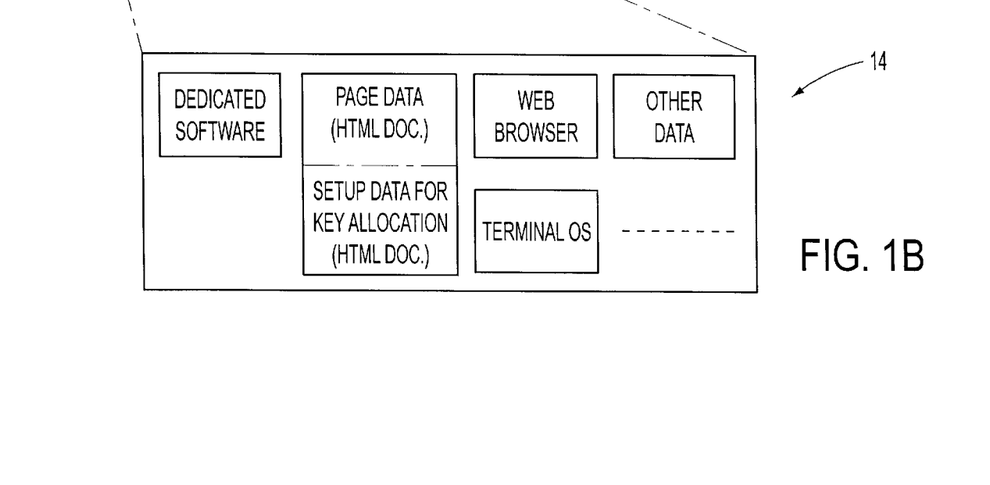

As shown in FIG. 1B, memory 14 stores dedicated software for operating a server itself, the data of a plurality of pages described in the language along the specification of the HTML to be hyperlinked, and setup data for allocating keys for each page described in the language along the specification of the HTML to the data of each page.

Here, although the data of the page and the setup data corresponding to the page may be formed as independent data, in this embodiment, both data are formed as one HTML document described in the language of the specification along the HTML. More specifically, in order to manage the data and make access to the data easy, the setup data is described as the data of a part of a corresponding page.

In addition, memory 14 stores other data such as a Web browser for downloading data on each user terminal, a terminal OS, and a protocol.

Figure 2:
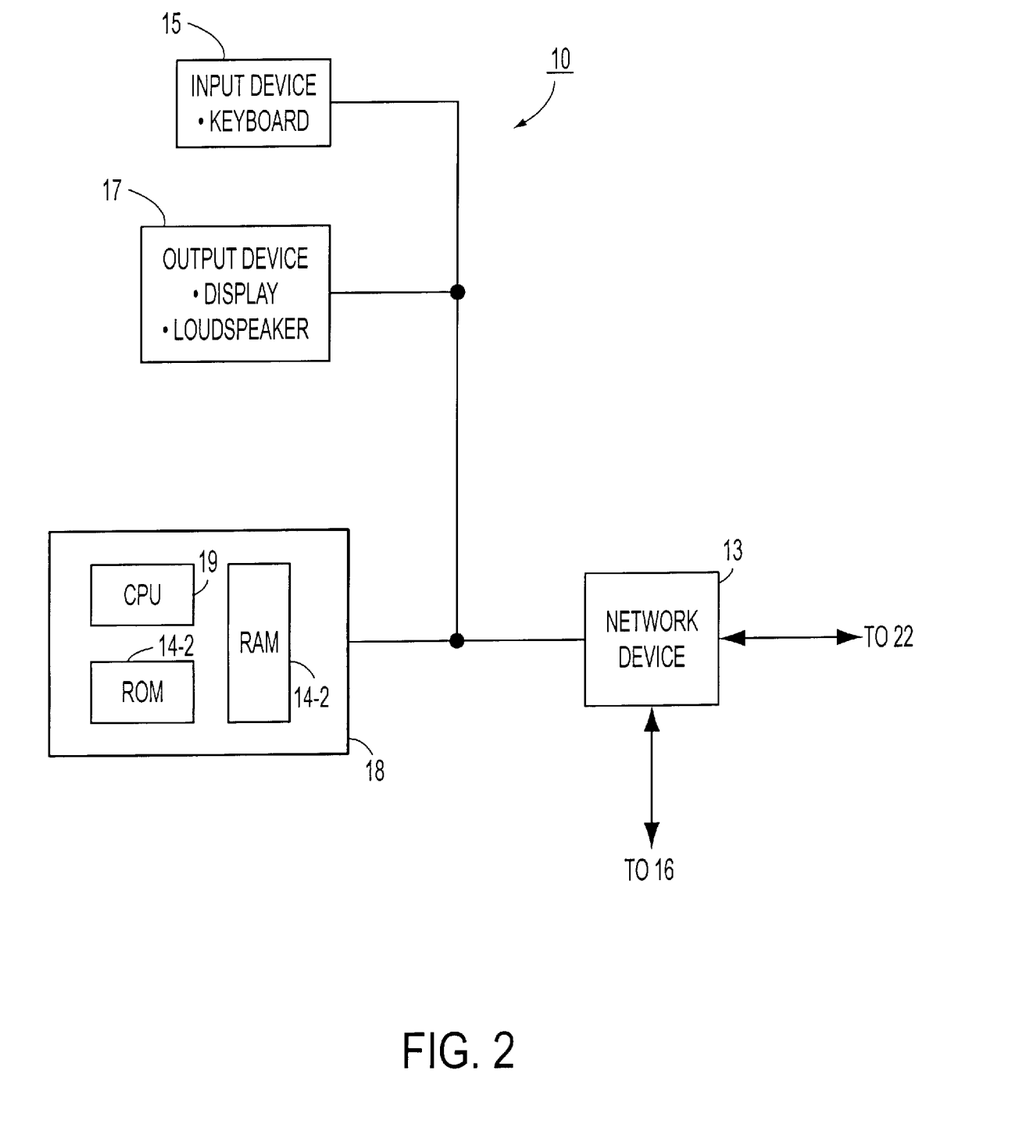
FIG. 2 is the functional block diagram of a server used in the network system shown in FIG. 1.

FIG. 2 shows the functional block diagram of the server 10. The server 10 is constituted by a network line 22, the network device 13 connected to a user terminal 30 and each WWW server 12 through the Internet line 16, an input device 15 in which an device means such as various keys and a mouse are arranged, an output device 17 in which an output device such as a display, a loudspeaker, and a printer are arranged, and a processing device 18.

The processing device 18 is formed by a CPU 19, a ROM 14-1 and a RAM 14-2 in which various programs and data are stored and which are also used as operation areas. The ROM 14-1 also functions as the memory 14.

Each of the user terminals 30 allows access to the server 10 through the network line 22 to read page data stored in the memory 14, and to display the page data on the display of the corresponding user terminal 30.

Figure 3:
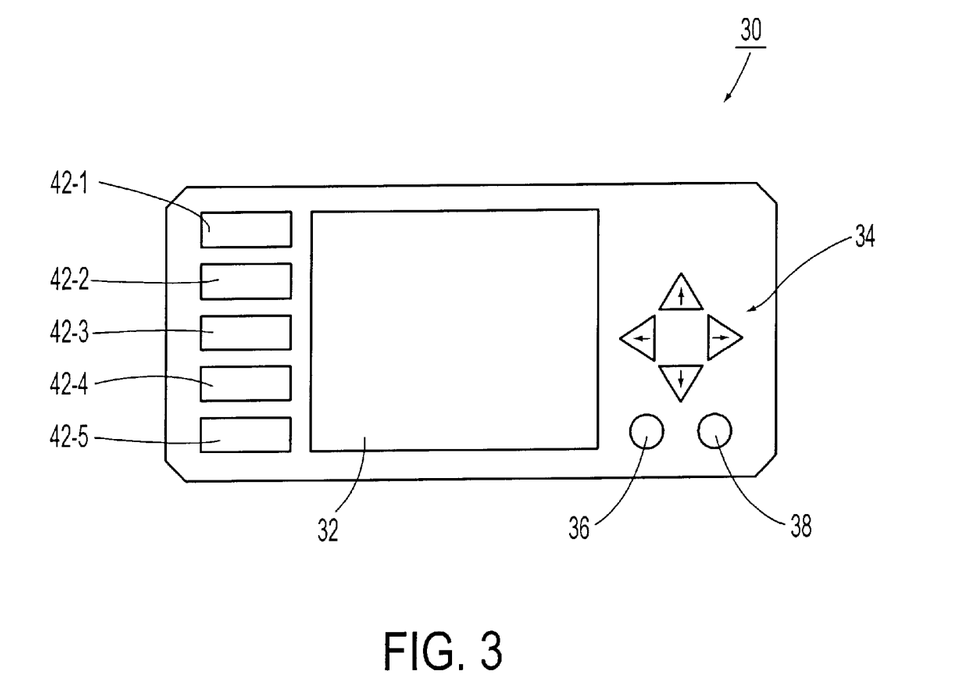
FIG. 3 is a view for explaining the appearance of a user terminal used in the network system shown in FIG. 1.

FIG. 3 briefly shows the appearance of the user terminal 30.

The user terminal 30 according to this embodiment is formed to have a small size and a light weight such that it can be arranged on a table of the restaurant without interfering. More specifically, an LCD display 32 is arranged at the center of the user terminal 30, and various operation keys are arranged on the left and right sides of the display 32. On the right side of the display 32, cursor operation keys 34 for moving a cursor to the upper, lower, left, and right sides, an OK key 36, and a cancel key 38 are arranged. On the left side of the LCD display 32, five multi-function keys 42-1, 42-2, . . . 42-5 are arranged in a line.

Figure 4:
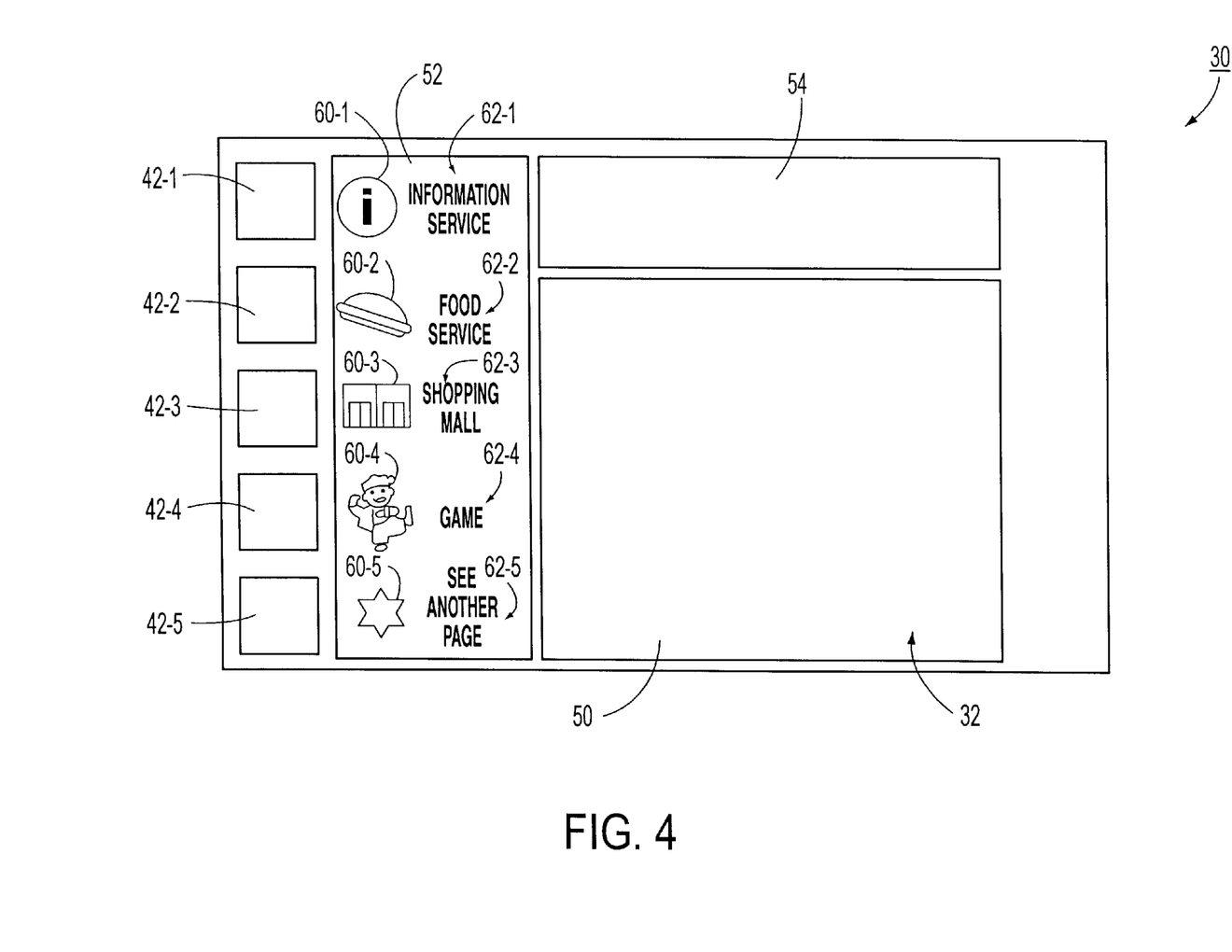
FIG. 4 is a view for explaining an example of a screen displayed on the user terminal.

FIG. 4 shows an example of a display screen on the display 32 of the user terminal 30.

In this embodiment, a contents display area 50 is provided in which page data of the server 10 is displayed, a key table display area 52 is provided for displaying key functions allocated to the multi-function keys 42-1, 42-2, . . . 42-5 and a server message display area 54 is provided for displaying a message which is spontaneously transmitted from the server side.

In the contents display area 50, various pages of the server 10 are displayed as described above. In this embodiment, a plurality of pages stored in the memory 14 are sequentially browsed by using a Web browser (to be described later) so that the various pages can be displayed as images. At this time, depending on the contents of the pages displayed on the contents display area 50, functions allocated to the multi-function keys 42-1, 42-2, . . . 42-5 also change at any time.

The key table display area 52 is arranged adjacent to the multi-function keys 42-1, 42-2, . . . 42-5 to have a rectangular shape, and a plurality of animation characters 60-1, 60-2, . . . 60-5 and letter information 62-1, 62-2, . . . 62-5 which display the functions of the multi-function keys 42-1, 42-2, . . . 42-5 as animations and letters are displayed in the key table display area 52.

For example, when an order function for a restaurant is allocated to the multi-function key 42-2, the character of sandwiches representing food is displayed as the animation character 60-2 corresponding to the multi-function key 42-2, and the letters of FOOD SERVICE are displayed as the letter information 62-2. For this reason, a user can instantaneously visually determine the functions allocated to the respective keys 42-1, 42-2, . . . 42-5.

Figure 9A:
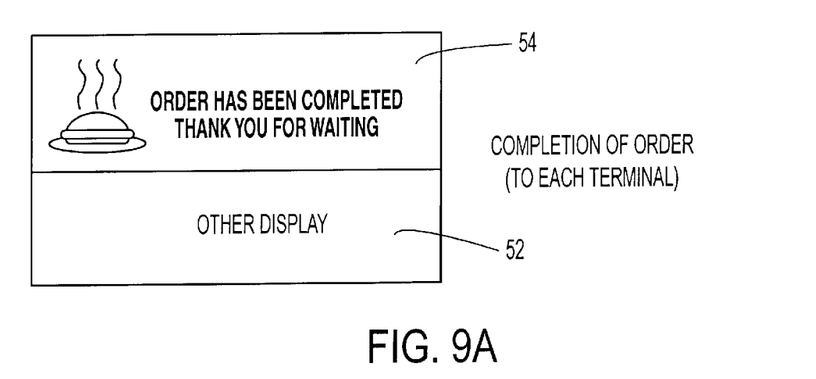
FIGS. 9A and 9B are views for explaining the display screen of a spontaneously transmitted message displayed on the user terminal and transmitted from the server.
Figure 9B:
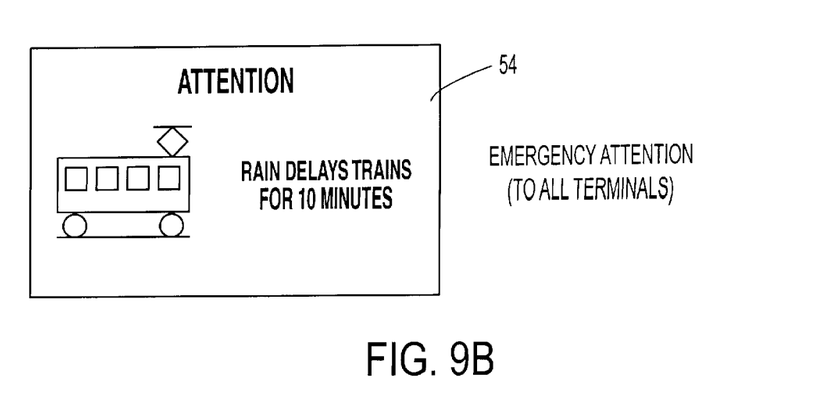

In the server message display area 54, various messages are provided to be spontaneously transmitted from the server 10 to each user terminal. For example, as shown in FIG. 9A, a message, e.g., "YOUR ORDER HAS BEEN COMPLETED. THANK YOU FOR WAITING" is displayed at a restaurant, or as shown in FIG. 9B, an emergency message, e.g., "RAIN DELAYS TRAINS FOR 10 MINUTES" is displayed. In addition, when these messages are not displayed, for example, various commercial messages may be displayed in the display area 54.

As described above, both the page data and the setup data for key allocation which are stored in the memory 14 are described by using a language along the specification of the Hyper Text Makeup Language (HTML) serving as a language for designing screens of the WWW of the Internet. For this reason, both the page data and the setup data can be displayed as screens having hyperlinked structures in the contents display area 50 and the key table display area 52 by using the Web browser, respectively. In particular, anchors hyperlinked to the next page are buried in the screens displayed in the display areas 50 and 52, and the operations of the anchors are allocated to the multi-function keys 42-1, 42-2, . . . 42-5, so that access to the next page can be easily realized by using the Web browser.

It is important in this embodiment that data is spontaneously transmitted from the server 10 side to the desired user terminal 30 to be displayed, as described above.

For this purpose, various data spontaneously transmitted from the server 10 to each user terminal 30 are described by using a language extended along the rules of the HTML. Therefore, the Web browser of the user terminal 30 interprets the data spontaneously transmitted from the server 10, and the contents of the data can be displayed as an image in the server message display area 54 on the display 32.

Figure 8:
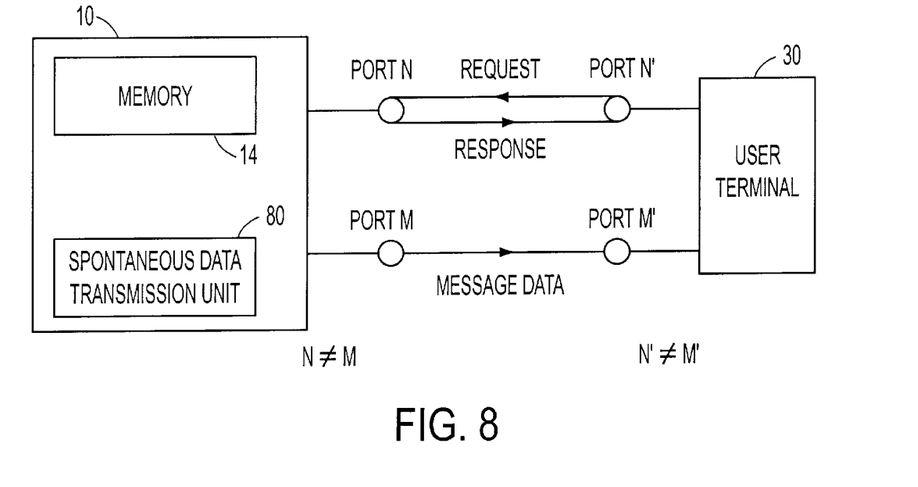
FIG. 8 is a view for explaining connection ports of the server and the user terminal and the flow of data.

FIG. 8 shows a path on which data is transmitted/received between the server 10 and the user terminal 30.

In general, a plurality of ports are arranged for the server 10 and the user terminal 30. In this embodiment, of the plurality of ports, the Nth and N'th ports of the server 10 and the user terminal 30 are used as data transmission/reception ports of the server-client model. In addition, the Mth and M'th ports of the server 10 and the user terminal 30 are used as ports for spontaneously transmitting from the server 10 to the user terminal 30.

In the server 10, dedicated software stored in the memory 14 is formed such that the CPU 19 functions as a spontaneous data transmission device. More specifically, the dedicated software stored in the memory 14, the CPU 19, the input device 15, and the network device 13 function as a spontaneous data transmission unit 80. When there is necessity of spontaneous data transmission from the server 10 to an arbitrary user terminal 30, the spontaneous data transmission unit 80 transmits data described by using a language along the specification of the HTML to the user terminal 30 serving as the object through the ports M and M'.

At this time, the spontaneously transmitted data may be input by a system manager using the input device 15, or may be automatically input by the CPU 19 under predetermined conditions.

As has been described above, when a desired page transmission request is transmitted as a request to the server 10, the user terminal 30 detects a response from the server 10 received through the port N', i.e., reception of a new page and data subordinate to the new page, and the user terminal 30 displays the page and data in the contents display area 50 and the key table display area 52.

The Web browser of the user terminal 30 always monitors spontaneously transmitted data transmitted from the server 10 through the ports M and M' completely independently of transmission/reception of the data through the ports N and N'. When data is received from the port M', the data is interpreted as spontaneously transmitted data from the server 10, and the contents of the data are displayed in the server message display area 54.

In this manner, when the ports M and M' which are completely different from the ports N and N' used for general transmission/reception are used for spontaneous data transmission from the server 10, the transmitted data can be reliably detected by the user terminal 30 and can be displayed in the server message display area 54.

Figure 5:
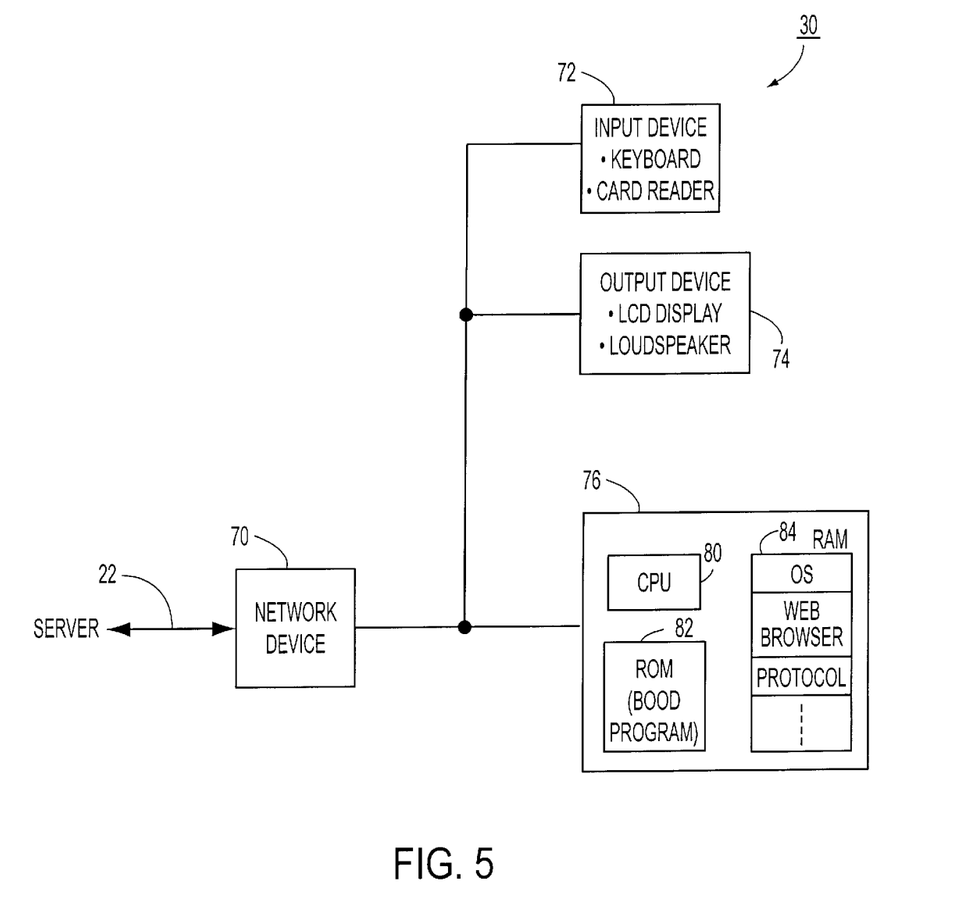
FIG. 5 is the functional block diagram of the user terminal.

FIG. 5 shows the functional block diagram of the user terminal 30. The user terminal 30 is formed by a network device 70 connected to the server 10 through the network line 22; an input device 72 in which the above various keys, a card reader (not shown), and the like are arranged; an output device 74 in which the LCD display 32, a loudspeaker (not shown), and the like are arranged; and a processing device 76.

The processing device 76 is formed by a CPU 80; a ROM 82 in which various programs are stored; and a RAM 84. In the ROM 82, a boot program is stored for driving the CPU 80 to start the user terminal 30 when the power supply of the user terminal 30 is turned on. In this embodiment, this boot program is designed in the following manner. That is, when the power supply of the user terminal is turned on, the CPU 80 accesses the memory 14 of the server 10, loads a terminal OS, a Web browser, various protocols for communication, the data of the start page of the server 10, and setup data for key allocation allocated to this home page, and downloads these data in the RAM 84.

Figure 6:
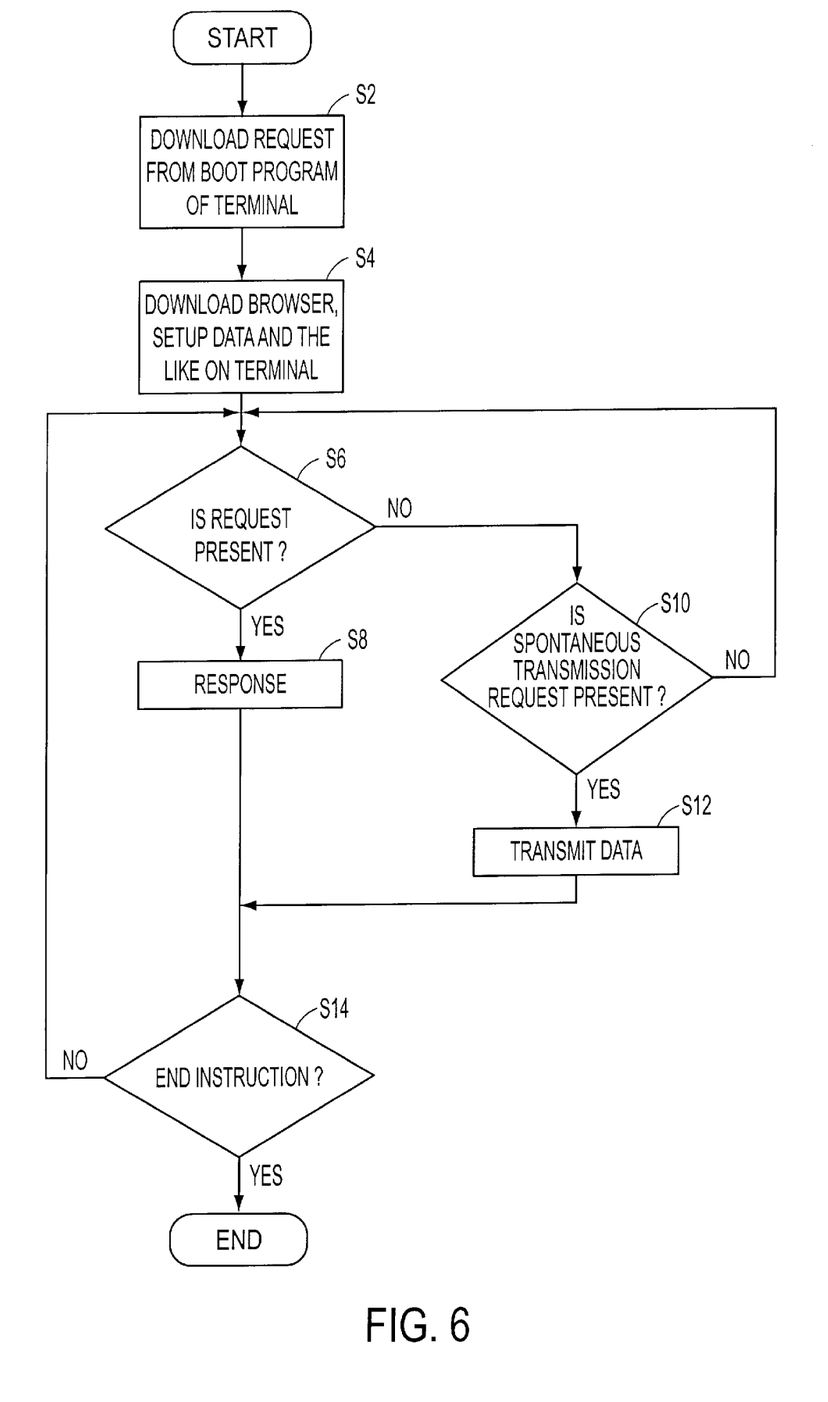
FIG. 6 is a flow chart showing the operation of the server.

FIG. 6 briefly shows an operation flow chart of the server 10.

In the system of this embodiment, when the power supplies of the user terminals 30-1, 30-2, . . . of the system are turned on to start the system, the Web browser, the terminal OS, and other data are downloaded in the RAMs 84 of the user terminals 30-1, 30-2, . . . in response to requests from the user terminals 30-1, 30-2, . . . based on the boot program (steps S2 and 4).

In this manner, in a state wherein the system is started, the user terminals 30-1, 30-2, . . . are set in the same state, and can be used by users.

Thereafter, the multi-function keys 42 of the user terminal 30 are operated. If the request of an arbitrary page is requested by the Web browser (step S6), the server 10 transmits the requested page and setup data corresponding to this page to the corresponding user terminal 30 as response data (step S8).

When a spontaneous transmission request (request of transmission which does not corresponds to a request) of data is generated from the server 10 to the user terminal 30 (step S10), the data is transmitted to the corresponding user terminal 30 (step S12).

As a result, the data transmission/reception described above is repetitively performed until the power supply of the server 10 is turned off to output an instruction of the end of use (step S14).

Figure 7:
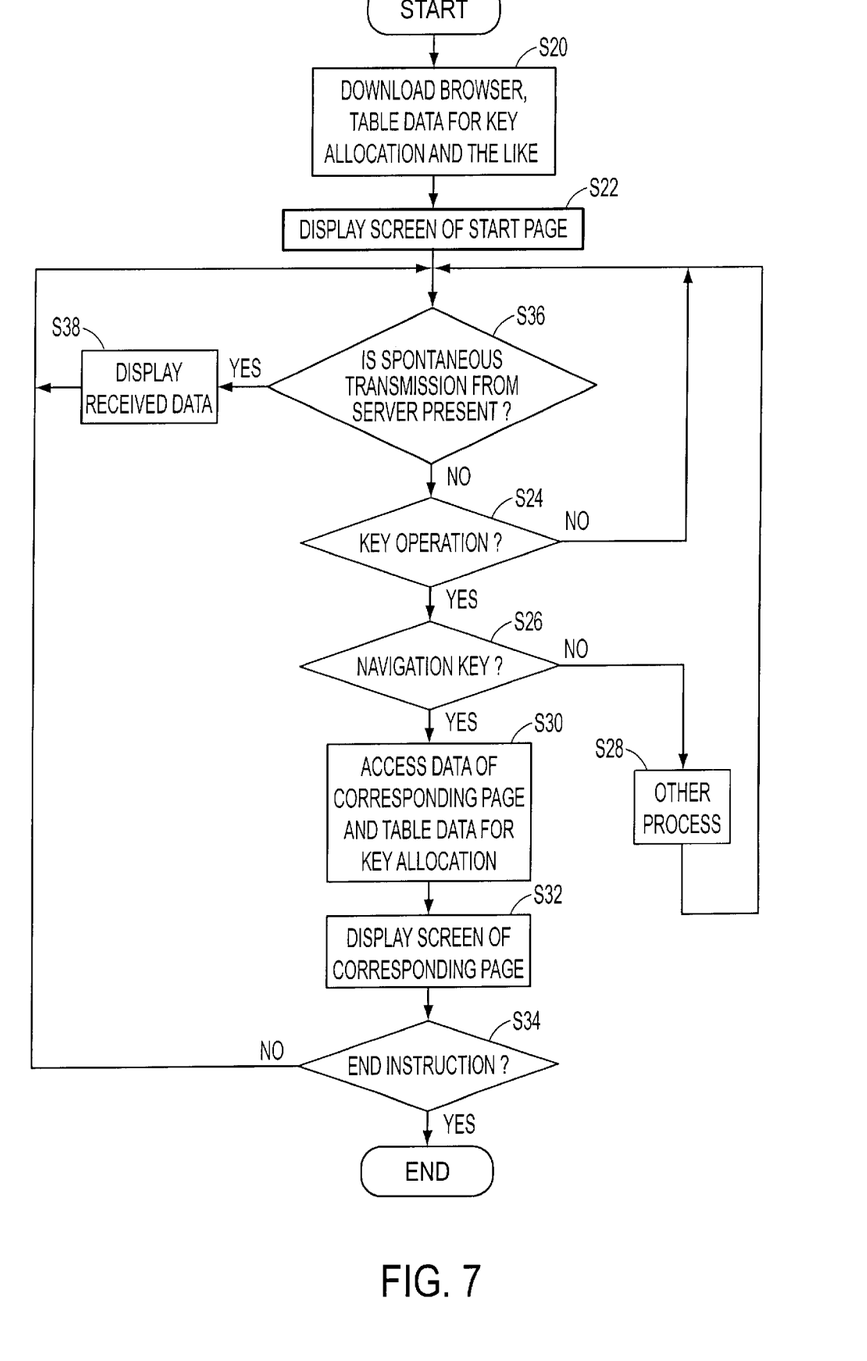
FIG. 7 is a flow chart showing the operation of the user terminal.

FIG. 7 shows the operation flow chart of the user terminal 30.

When the power supply of the user terminal 30 is turned on to start the user terminal 30, the CPU 80 accesses the server 10 through the network device 70 and the network line 22 according to the boot program stored in the ROM 82, and the CPU 80 reads the terminal OS, the Web browser, the protocols, and the other required data stored in the memory 14 and downloads them in the RAM 84 of the user terminal 30 (step S20). At this time, data for reading the start page of the server 10 is also downloaded as subordinate data.

The user terminal 30 accesses the memory 14 of the server 10 by using the Web browser to read the data of the start page read from page data at the beginning, and read setup data for key allocation subordinate to the data of the start page. The user terminal 30 displays this data on the display 32 as the screen of the start page read at the beginning as shown in FIG. 4 (step S22). At this time, the data of the start page is displayed in the contents display area 50. On the basis of the setup data for key allocation, a function for calling an information service, a function for calling a food service, a function for searching a shopping mall, a function for calling a game, and a function for reading an external page are allocated to the multi-function keys 42-1, 42-2, . . . 42-5. The explanation of the allocated functions are displayed in the key table display area 52 as the animation characters 60 and the letter information 62. Therefore, a user can instantaneously visually determine the functions allocated to the respective keys 42.

In the start page shown in FIG. 4, a navigation function for guiding a user from a page which is displayed at present to a page for presenting the services allocated to the respective keys is set for the multi-function keys 42-1, 42-2, . . . 42-5. Therefore, when any one of keys is operated, the user can be guided to the page for presenting the corresponding service.

For example, in the start page shown in FIG. 3, when a user operates any key (step S24), the CPU 80 determines whether the operated key is one of the navigation keys 42-1, 42-2, . . . 42-5 (step S26). If it is determined that the operated key is not a navigation key, another process according to the corresponding key operation is performed (step S28).

If it is determined that the operated key is a navigation key, the CPU 80 accesses the server 10 to read the data of the corresponding page and the setup data for key allocation subordinate to the data from the memory 141 (step S30), and the CPU 80 downloads the read page and the setup data to display them in the contents display area 50 and the key table display area 52. Functions corresponding to the newly read page are allocated to the respective multi-function keys 42-1, 42-2, . . . 42-5 (step S32).

In this manner, when a user displays a desired page on the display 32 of the user terminal 30, if data spontaneously transmitted from the server 10 is received (step S36), the Web browser of the user terminal 30 interprets the received data to display the contents of the data as an image in the server message display area 54, for example, as shown in FIG. 9 (step S38). Therefore, the user can recognize a message or the like spontaneously transmitted from the server 10. For example, when a dish is ordered at a restaurant, the user can know the completion of the ordered dish as an image display as shown in FIG. 9A. In addition, when a user waits for an order at the restaurant, the user can know an emergency attention sent from the server 10 as the display image shown in FIG. 9B.

Data spontaneously transmitted from the server 10 may be displayed as an interrupt display image if necessary. For example, the emergency attention or the like sent from the server 10 may be displayed as an interrupt image in the entire screen as shown in FIG. 9B.

The presentation of such a service is repetitively performed until the power supply of the server 10 is turned off to output an instruction of the end of use (step S34).

As has been described above, in the system of this embodiment, all of the data of each page transmitted from the server 10 to the user terminal 30, setup data, and spontaneously transmitted data are described by using a language along the specification of the HTML which can be interpreted by the Web browser. Therefore, according to the system of the present invention, a system which transmits/receives interactive data between the server 10 and the user terminal through the Web browser set on the user terminal 30 side can be constructed without using a cumbersome means such as E-mail.

In this embodiment, an example wherein the present invention is installed at a restaurant or the like of an amusement park is explained. However, the present invention is not limited to the embodiment, and the present invention can be used in various applications as needed.

For example, user terminals 30 according to the present invention are arranged in rooms of a hotel, so that a user of each room can order various services. In addition, the present invention can also be widely used to present various services in a baseball ground, a theater, or the like.

What is claimed is:

1. A network system responsive to an order by a user, comprising:
    a server machine having a spontaneous transmitting device;
    a plurality of user terminals, each having a display device and an input device;
    a first port through which a request is transmitted from the user terminal to the server machine and first data is transmitted from the server machine to the user terminal in response to the request, the request transmitted through the first port being in response to operation of the input device; and
    a second port through which second data is spontaneously transmitted from the server machine to the user terminal, the second port being only for use of spontaneously transmitting the second data,
    wherein the display device of the user terminal displays contents of service capable of being ordered from the user terminal based on the first data transmitted through the first port, the input device of the user terminal inputs the order corresponding to the contents of service displayed on the display device as the request to be transmitted to the server machine through the first port,
    the spontaneous transmitting device of the server machine spontaneously transmits the second data to the user terminal through the second port at least when the order requested from the user terminal is completed, the second data is described in a language along the specification of an HTML and the display device of the user terminal also displays a message indicating a completion of the order based on the second data by using a Web browser in response to reception of the second data.

2. The network system according to claim 1, wherein said user terminal displays a display screen of the display device such that the display screen is divided into a first display area that displays the contents of service based on the first data and a second display area that displays the massage based on the second data spontaneously transmitted.

3. The network system according to claim 1, wherein said server machine stores the contents of service to be presented to said user terminal as the first data of a plurality of pages which are described in the language along the specification of the HTML to be hyperlinked.

4. The network system according to claim 1, wherein each of said user terminals interrupt-displays the massage based on the spontaneously transmitted second data on the display device when the second data is received from said second port.

5. A user terminal responsive to an order by a user and capable of being connected to a network system having a server machine that transmits first data to the user terminal in response to a request from the user terminal and spontaneously transmits second data to the user terminal, comprising:
    a first port that transmits the request to the server machine and receives the first data transmitted from the server machine in response to the request;
    a second port that receives the second data spontaneously transmitted from the server machine, the second port being only for use of receiving the second data spontaneously transmitted from the server machine;
    a display device that displays contents of service capable of being ordered from the user terminal based on the first data received through the first port; and
    an input device for inputting the order corresponding to the contents of service displayed on the display device as the request,
    where in the second data is transmitted through the second port from the server machine at least when the order requested from the input device is completed, the second data is described in a language along a specification of an HTML and the display device also displays a message indicating a completion of the order based on the second data by using a Web browser in response to reception of the second data.

6. The user terminal according to claim 5, wherein said user terminal displays a display screen of the display device such that the display screen is divided into a first display area that displays the contents of service based on the first data and a second display area that displays the massage based on the second data spontaneously transmitted.

7. The user terminal according to claim 5, wherein said user terminal interrupt-displays the massage based on the second data spontaneously transmitted on the display device when the second data is received from said second port.

8. The network system according to claim 1, wherein the input device comprises a multi-function key and a function allocated to the multi-function key changes depending on the contents of service displayed on the display device.

9. The network system according to claim 8, wherein the display device also displays the function allocated to the multi-function key.

10. The user terminal according to claim 5, wherein the input device comprises a multi-function key and a function allocated to the multi-function key changes depending on the contents of service displayed on the display device.

11. The user terminal according to claim 10, wherein the display device also displays the function allocated to the multi-function key.

12. A network system, comprising:
    a server machine having a spontaneous transmitting device;
    a plurality of user terminals, each having a display device;
    a first port through which a request is transmitted from the user terminal to the server machine and first data is transmitted from the server machine to the user terminal in response to the request; and a second port through which second data is spontaneously transmitted from the server machine to the user terminal, the second port being only for use of spontaneously transmitting the second data, wherein the second data is described in a language along a specification of an HTML and the user terminal displays the second data on the display device by using a Web browser in response to reception of the second data.

13. The network system according to claim 12, wherein the display device also displays contents of the first data transmitted through the first port from the server machine.

14. The network system according to claim 12, wherein the display device displays contents of service capable of being ordered from the user terminal based on the first data and also displays a message indicating a completion of order requested from the user terminal based on the second data.

15. A user terminal capable of being connected to a network system having a server machine, that transmits first data to the user terminal in response to a request from the user terminal and spontaneously transmits second data to the user terminal, comprising:

a first port that transmits the request to the server machine and receives the first data transmitted from the server machine in response to the request;

a second port that receives the second data spontaneously transmitted from the server machine, the second port being only for use in receiving the second data spontaneously transmitted from the server machine, the second data described in a language along a specification of an HTML; and a display device that displays the second data by using a Web browser in response to reception of the second data.

16. The user terminal according to claim 15, wherein the display device also displays contents of the first data received through the first port.

17. The user terminal according to claim 15, wherein the display device displays contents of service capable of being ordered from the user terminal based on the first data and also displays a message indicating a completion of order requested from the user terminal based on the second data.

18. A server machine capable of being connected to a network system having at least one user terminal, the user terminal transmitting a request to the server machine, receiving first data and second data transmitted from the server machine and displaying the second data on a display device, the server machine comprising:

a first port that receives the request transmitted from the user terminal and transmits the first data to the user terminal in response to the request; and a second port that spontaneously transmits the second data to the user terminal, the second port being only for use of spontaneously transmitting the second data to the user terminal, wherein the second data is described in a language along a specification of an HTML and capable of being displayed by using a Web browser on the display device of the user terminal in response to the reception of the second data.

19. The server machine according to claim 18, wherein the first data is capable of being displayed on the display device of the user terminal and includes contents of service capable of being ordered from the user terminal, and the second data indicates a completion of order requested from the user terminal.

* * * * *